(12) United States Patent
Jikihara et al.

(10) Patent No.: US 9,321,047 B2
(45) Date of Patent: Apr. 26, 2016

(54) ANION EXCHANGE MEMBRANE AND METHOD FOR PRODUCING SAME

(71) Applicant: KURARAY CO., LTD., Kurashiki-shi (JP)

(72) Inventors: Atsushi Jikihara, Kurashiki (JP); Kenichi Kobayashi, Kurashiki (JP); Naoki Fujiwara, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/218,080

(22) Filed: Mar. 18, 2014

(65) Prior Publication Data

US 2014/0200280 A1   Jul. 17, 2014

Related U.S. Application Data

(62) Division of application No. 13/259,981, filed as application No. PCT/JP2010/055110 on Mar. 24, 2010, now Pat. No. 8,716,358.

(30) Foreign Application Priority Data

Mar. 25, 2009 (JP) ................. 2009-074805
Jun. 17, 2009 (JP) ................. 2009-144543

(51) Int. Cl.
*B01J 41/14* (2006.01)
*B01D 61/44* (2006.01)
(Continued)

(52) U.S. Cl.
CPC ............. *B01J 41/14* (2013.01); *B01D 61/44* (2013.01); *B01D 69/02* (2013.01); *B01D 71/80* (2013.01);
(Continued)

(58) Field of Classification Search
USPC .................. 521/27; 429/317, 30, 33
See application file for complete search history.

(56) References Cited

U.S. PATENT DOCUMENTS 3,689,315 A   9/1972 Lyon et al.
3,821,127 A *  6/1974 Mizutani et al. ............. 521/27
(Continued)

FOREIGN PATENT DOCUMENTS

GB   1 284 184   8/1972
JP   51 40556    11/1976
(Continued)

OTHER PUBLICATIONS

International Search Report Issued Jun. 15, 2010 in PCT/JP10/055110 Filed Mar. 24, 2010.
(Continued)

*Primary Examiner* — Peter D Mulcahy
*Assistant Examiner* — Henry Hu
(74) *Attorney, Agent, or Firm* — Oblon, McClelland, Maier & Neustadt, L.L.P

(57) ABSTRACT

There is provided an anion exchange membrane comprising, as a main element, a block copolymer having a vinyl alcohol polymer block and a cationic-group containing polymer block as components and which is subjected to a crosslinking treatment. An anion exchange membrane is produced by heating a film obtained from a solution of the block copolymer at a temperature of 100° C. or more, crosslinking the film with a dialdehyde compound in water, an alcohol or a mixture of these under an acidic condition and then washing the film with water. Thus, there can be provided an anion exchange membrane in which organic fouling can be prevented and which exhibiting excellent basic properties such as a membrane resistance and an ionic transport number and excellent membrane strength.

6 Claims, 2 Drawing Sheets

(51) Int. Cl.
  *B01D 69/02* (2006.01)
  *B01D 71/80* (2006.01)
  *C08J 3/24* (2006.01)
  *C08J 5/22* (2006.01)
  *C08F 293/00* (2006.01)
  *B01D 71/38* (2006.01)

(52) U.S. Cl.
  CPC ........... *C08F 293/00* (2013.01); *C08J 3/24* (2013.01); *C08J 5/2231* (2013.01); *C08J 5/2287* (2013.01); *B01D 71/38* (2013.01); *B01D 2325/16* (2013.01); *C08J 2325/18* (2013.01); *C08J 2329/04* (2013.01); *C08J 2333/14* (2013.01); *C08J 2339/02* (2013.01)

(56) References Cited

U.S. PATENT DOCUMENTS

| | | | |
|---|---|---|---|
| 4,355,116 A | 10/1982 | Lee et al. | |
| 4,565,854 A | 1/1986 | Sato et al. | |
| 5,178,854 A | 1/1993 | Asami et al. | |
| 8,182,949 B2 * | 5/2012 | Ohgi et al. | 429/317 |
| 8,716,358 B2 * | 5/2014 | Jikihara | B01D 61/44 429/317 |
| 2003/0024816 A1 | 2/2003 | Aritomi et al. | |
| 2007/0026282 A1 * | 2/2007 | Kumagai et al. | 429/30 |
| 2010/0098997 A1 | 4/2010 | Ohgi et al. | |

FOREIGN PATENT DOCUMENTS

| | | |
|---|---|---|
| JP | 59 187003 | 10/1984 |
| JP | 59 189113 | 10/1984 |
| JP | 62-252432 A | 11/1987 |
| JP | 63-77504 | 4/1988 |
| JP | 01-316324 A | 12/1989 |
| JP | 3 146525 | 6/1991 |
| JP | 07-204523 A | 8/1995 |
| JP | 2003-082130 A | 3/2003 |
| JP | 2007 265955 | 10/2007 |
| JP | 2008 525612 | 7/2008 |
| WO | 2006/071181 A1 | 7/2006 |
| WO | WO-2006/071181 A1 * | 7/2006 |
| WO | 2008 090774 | 7/2008 |
| WO | WO-2008/090774 A1 * | 7/2008 |
| WO | 2010/110333 A1 | 9/2010 |
| WO | WO-2010/110333 A1 * | 9/2010 |

OTHER PUBLICATIONS

A.K. Pandey, et al., Journal of Polymer Science Part A: Polymer Chemistry, vol. 39, pp. 807-820 (2001).

Extended European Search Report issued in EP 10756129.2 on Jul. 4, 2013.

Notification of Reasons for Rejection issued Jun. 17, 2014 in Japanese Patent Application No. 2011-506094 (with English language translation).

* cited by examiner

ANION EXCHANGE MEMBRANE AND METHOD FOR PRODUCING SAME

This application is a Divisional Application of U.S. patent application Ser. No. 13/259,981, filed on Sep. 23, 2011, now U.S. Pat. No. 8,716,358, which was a 371 of International Patent Application No. PCT/JP10/55110, filed on Mar. 24, 2010, and claims priority to Japanese Patent Application 2009-074805, filed on Mar. 25, 2009, and Japanese Patent Application No. 2009-144543, filed on Jun. 17, 2009.

TECHNICAL FIELD

The present invention relates to an anion exchange membrane containing, as a main element, a vinyl alcohol polymer block (A) and a cationic-group containing polymer block (B) as components and having a cross-linked structure. In particular, the invention relates to an anion exchange membrane with a lower membrane resistance and less organic fouling which is useful for electrodialysis.

BACKGROUND ART

Ion exchange membranes are used as an ion separation membrane in electrodialysis and diffusion dialysis for a wide variety of applications such as condensation of seawater, desalting and removal of nitrate-nitrogen from under ground brine for providing drinking water, desalting in a process for producing a food and condensation of an active ingredient for a medicinal drug. Ion exchange membranes useful in these applications are typically styrene-divinylbenzene based homogeneous ion exchange membranes, which have been improved to such a level that they can be employed in an industrially useful separation after development of various technologies such as permselectivity of monovalent and divalent ions, improvement in selectivity for a particular ion and lowering a membrane resistance.

Generally, salts are often formed as by-products in a process for producing an organic compound in a field such as foods, medicinal drugs and pesticides. Salts contained in such an organic compound are often separated by electrodialysis. In separation of salts by electrodialysis, a direct current is applied to cation exchange membranes and anion exchange membranes which are alternately aligned, to transfer cations to a cathode side of the cation exchange membrane and to transfer anions to an anode side of the anion exchange membrane, respectively. Thus, desalting is achieved by removing salts from an electrolyte solution in a room sandwiched by the cathode side of the cation exchange membrane and the anode side of the anion exchange membrane. Electrodialytic desalting of a liquid to be processed is accompanied by a problem of so-called organic fouling of a membrane where membrane performance is deteriorated due to adhesion of an organic contaminant, particularly electrically-charged macromolecules (hereinafter, referred to as "macro-organic ions") in a liquid to be processed.

In an anion exchange membrane, which is particularly susceptible to organic fouling, membrane performance is gradually deteriorated as a dialysis cycle proceeds, and in some cases, with marked contamination, a membrane swollen or broken in a relatively shorter time.

An anion exchange membrane preventing organic fouling which is well-known in the art is an anion exchange membrane which is designed to prevent macro-organic ions from permeating into the membrane. This membrane has a structure where a thin film which is neutral, amphoteric or oppositely charged to an ion exchange group is formed on the surface of the membrane. The more compact a membrane structure is and the larger a molecular weight of the macro-organic ion, the more effective such an anion exchange membrane is. For example, there has been described an anion exchange membrane wherein the surface is modified with a sulfonic group having an opposite charge for preventing an anionic macro-organic ion from permeating into the membrane (Patent Reference 1). Furthermore, there has been an anion exchange membrane in which resistance to organic fouling is improved by optimizing a counter-ion structure in an anion exchange group (Patent Reference 2).

PRIOR ART REFERENCES

Patent References

Patent Reference 1: JP 51-40556 B
Patent Reference 2: JP 3-146525 A
Patent Reference 3: JP 59-189113 A
Patent Reference 4: JP 59-187003 A

SUMMARY OF THE INVENTION

Problem to be Solved by the Invention

However, an anion exchange membrane designed to prevent a macro-organic ion from permeating into the membrane as described above can be resistant to organic fouling to some extent, but has a defect that an oppositely-charged layer formed on the surface of the membrane considerably increases a membrane resistance. Furthermore, an anion exchange membrane in which a counter-ion structure in an anion exchange group is devised exhibits insufficient resistance to organic fouling.

An objective of the present invention is, therefore, to provide an ion exchange membrane which can minimize organic fouling, exhibits excellent basic properties such as a membrane resistance and ion permselectivity, and is useful for electrodialysis.

Means for Solving the Problems

We have intensely conducted investigation for achieving the above objective. We have finally found that an anion exchange membrane containing, as a main element, a block copolymer (P) having a vinyl alcohol polymer block (A) and a cationic-group containing polymer block (B) as components and which is subjected to a crosslinking treatment exhibits excellent resistant to organic fouling without deterioration in basic properties such as a membrane resistance and an ionic transport number, and is useful for electrodialysis, and have achieved this invention.

In the block copolymer (P), the polymer block (B) preferably has a repeating unit represented by general formulas (2) to (7).

[chem. 1]

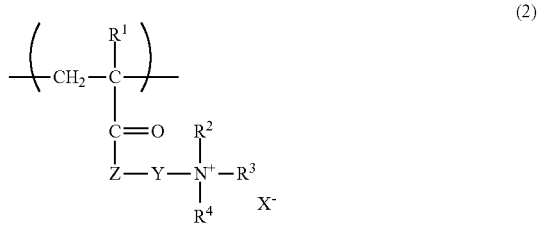

(2)

wherein $R^1$ represents hydrogen or alkyl group having 1 to 4 carbon atoms; $R^2$, $R^3$ and $R^4$ independently of each other represent hydrogen or optionally substituted alkyl group, aryl group or aralkyl group having 1 to 18 carbon atoms which are optionally combined to form a saturated or unsaturated cyclic structure; Z represents —O— or NH; Y represents a divalent linking group having 1 to 8 carbon atoms in total which can be interrupted by a heteroatom; and $X^-$ represents an anion.

[chem. 2]

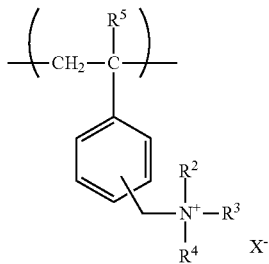

(3)

wherein $R^5$ represents hydrogen or methyl group; and $R^2$, $R^3$, $R^4$ and $X^-$ are as defined in general formula (2).

[chem. 3]

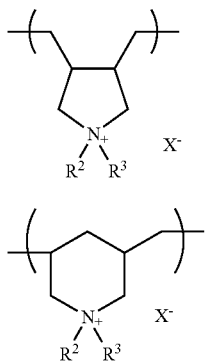

(4)

(5)

wherein $R^2$, $R^3$ and $X^-$ are as defined in general formula (2).

[chem. 4]

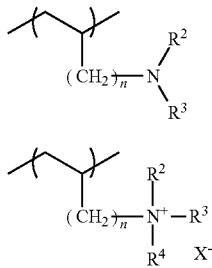

(6)

(7)

wherein n represents 0 or 1; and $R^2$, $R^3$, $R^4$ and $X^-$ are as defined in general formula (2).

Furthermore, in anion exchange of the present invention, an ion-exchange capacity is preferably 0.30 meq/g or more.

Furthermore, the above problem can be solved by providing an anion exchange membrane containing, as main elements, a mixture of a block copolymer (P) and a vinyl alcohol polymer (Q), wherein: the block copolymer (P) has a vinyl alcohol polymer block (A) and a cationic-group containing polymer block (B) as components, the vinyl alcohol polymer (Q) has a polymerization degree of 200 to 8000 and a saponification degree of 80 mol % or more, a mass ratio of the block copolymer (P) to the vinyl alcohol polymer (Q) (P/Q) is 3/97 or more, and the anion exchange membrane is subjected to a crosslinking treatment. Again, the polymer block (B) in the block copolymer (P) preferably has a repeating unit represented by general formulas (2) to (7). Furthermore, it is also preferable that an ion-exchange capacity is 0.30 meq/g or more.

A producing method of the present invention provides the anion exchange membrane of the present invention by heating a film obtained from a solution of the block copolymer (P) or a film obtained from a solution of a mixture of the block copolymer (P) and the vinyl alcohol polymer (Q) at a temperature of 100° C. or more, crosslinking the film with a dialdehyde compound in water, an alcohol or a mixture of these under an acidic condition and then washing the film with water.

Effects of the Invention

An anion exchange membrane of the present invention which is highly hydrophilic is highly resistant to organic fouling and has a small membrane resistance. Furthermore, since it is a block copolymer, swelling of the anion exchange membrane can be inhibited, and therefore it exhibits higher membrane strength, allowing for efficient and stable electrodialysis for a long period.

BEST MODE FOR CARRYING OUT THE INVENTION

Figure 1:
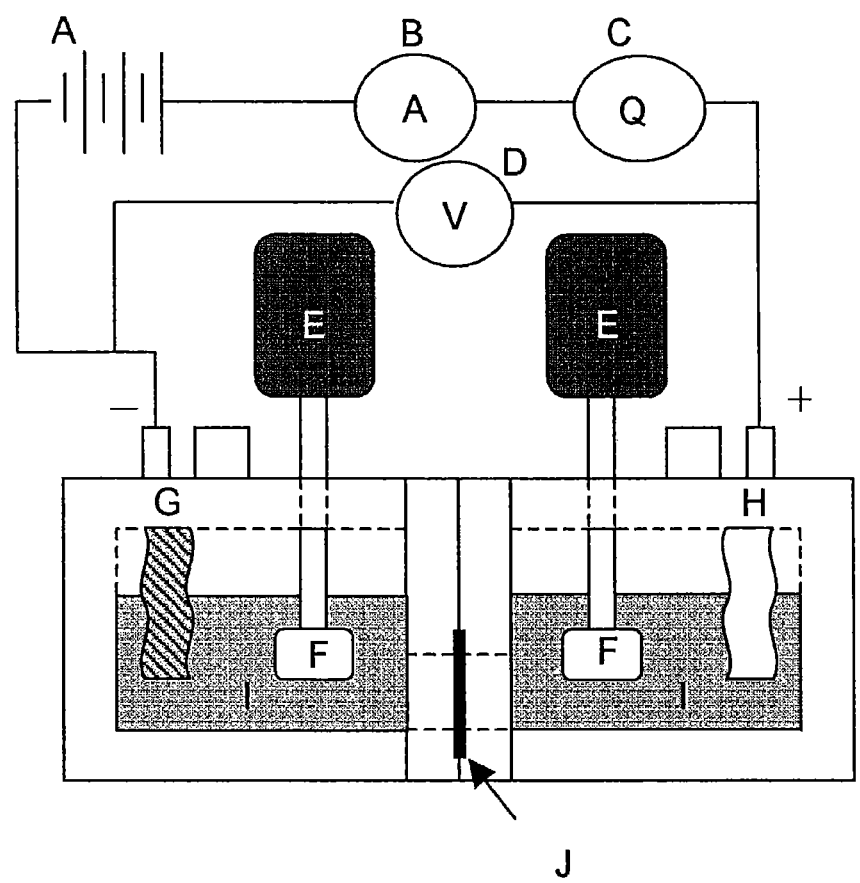
FIG. 1 schematically shows a device which can be used for determining a dynamic transport number of an anion exchange membrane according to the present invention.

An anion exchange membrane of the present invention is a membrane having anion exchange layer containing, as a main element, a block copolymer (P) having a vinyl alcohol polymer block (A) and a cationic-group containing polymer block (B) as components and having a cross-linked structure.

The anion exchange membrane of the present invention is characterized in that it contains, as a main element, a block copolymer (P) having a vinyl alcohol polymer block (A) and a cationic-group containing polymer block (B) as components. The most important property of an anion exchange membrane is anion conductivity (anion mobility). Here, it is key how an anion path (ion channel) is formed in a membrane. A block copolymer of the present invention having a vinyl alcohol polymer block (A) and a cationic-group containing polymer block (B), and both ion conductivity and membrane strength, dimensional stability and resistance to organic fouling can be successfully achieved by role sharing: a vinyl alcohol polymer block (A) responsible for overall strength, dimensional stability and resistance to organic fouling of the anion exchange membrane and a polymer block (B) exhibiting anion conductivity. Furthermore, in contrast to a blend type, a microphase separation structure between the vinyl alcohol polymer block (A) and the polymer block (B) can be easily controlled, and therefore, a size or structure of a continuous phase in the polymer block (B) acting as an ion channel can be easily controlled.

There are no particular restrictions to the number of polymer blocks in the block copolymer (P), as long as the copolymer is a diblock copolymer of the vinyl alcohol polymer block (A) and the polymer block (B), whereby each block can efficiently exert its functions.

A ratio of repeating units of the vinyl alcohol polymer block (A) to the polymer block (B) is preferably within the range of 99:1 to 50:50, more preferably within the range of 98:2 to 60:40, further preferably within the range of 95:5 to 70:30.

There are no particular restrictions to a repeating unit of the polymer block (B) in the block copolymer (P), and examples include repeating units represented by general formulas (2) to (7):

[chem. 5]

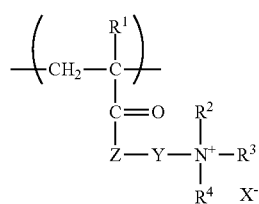
(2)

wherein $R^1$ represents hydrogen or alkyl group having 1 to 4 carbon atoms; $R^2$, $R^3$ and $R^4$ independently of each other represent hydrogen or optionally substituted alkyl group, aryl group or aralkyl group having 1 to 18 carbon atoms which are optionally combined to form a saturated or unsaturated cyclic structure; Z represents —O— or NH; Y represents a divalent linking group having 1 to 8 carbon atoms in total which can be interrupted by a heteroatom; and $X^-$ represents an anion;

[chem. 6]

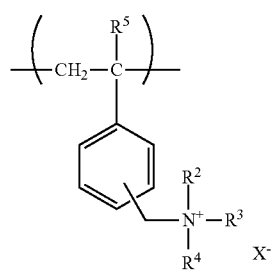
(3)

wherein $R^5$ represents hydrogen or methyl group; and $R^2$, $R^3$, $R^4$ and $X^-$ are as defined in general formula (2);

[chem. 7]

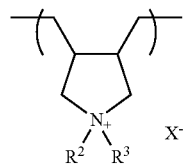
(4)

-continued

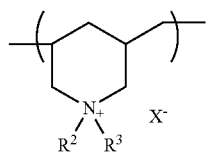
(5)

wherein $R^2$, $R^3$ and $X^-$ are as defined in general formula (2).

[chem. 8]

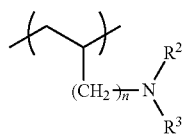
(6)

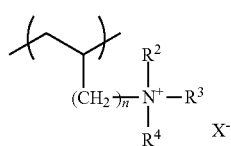
(7)

wherein n represents 0 or 1; and $R^2$, $R^3$, $R^4$ and $X^-$ are as defined in general formula (2).

An anion exchange membrane of the present invention is characterized in that it contains, as a main element, a block copolymer (P) having a vinyl alcohol polymer block (A) and a polymer block (B) having an anion exchange group as components. An important property of an anion exchange membrane is a charge density in the membrane; for example, it is well-known that when it is used in electrodialysis, a charge density significantly affects an ionic transport number. It is important to reduce swelling as much as possible while a charge amount is increased in a membrane.

As described above, a block copolymer as a main element of an anion exchange membrane of the present invention has a vinyl alcohol polymer block (A) and a polymer block (B) having an anion exchange group. The vinyl alcohol polymer block (A) is highly hydrophilic and contributes to strength of the overall anion exchange membrane, inhibition of swelling and shape retention. Such role sharing by the vinyl alcohol polymer block (A) and the ion-exchange polymer block (B) which exhibits ion exchangeability allows for successfully achieving both a higher charge density and inhibition of swelling and keeping dimensional stability in the anion exchange membrane. Furthermore, such an ion exchange membrane of the present invention has a small membrane resistance and exhibits excellent resistance to organic fouling. Furthermore, in the present invention, since a block copolymer is used in contrast to a blend type, a microphase separation structure of the vinyl alcohol polymer block (A) and the polymer block (B) can be easily controlled, and therefore, a size or structure of a continuous phase in the polymer block (B) acting as an ion-exchange site can be easily controlled.

The block copolymer (P) as a main element in the anion exchange membrane of the present invention has been subjected to a crosslinking treatment. The block polymer (P) can be produced by any of two general processes, that is, (1) producing a block copolymer using at least one monomer having a cationic group and another monomer and (2) producing a block copolymer, followed by introduction of a cationic group. For (1) of these processes, in the light of industrial convenience, it is preferable to produce a block copolymer by radical polymerization of a vinyl alcohol polymer (block (A)) containing a terminal mercapto group with at least one monomer containing a cationic group. For (2), a block copolymer (P) containing a polymer block (B) having a cationic group can be produced by obtaining a block polymer by block co-polymerization of a vinyl alcohol polymer containing a terminal mercapto group (block (A)) with one or more monomers, followed by introduction of a cationic group into a resulting block copolymer. Among these processes, it is particularly preferable to produce a block copolymer by radical polymerization of a vinyl alcohol polymer (block (A)) containing a terminal mercapto group with at least one monomer having a cationic group because the types and the amounts of components for a vinyl alcohol polymer block (A) and a cationic-group containing polymer block (B) can be easily controlled.

There will be described a process for producing a desired block copolymer (P) using at least one monomer having a cationic group, which is suitably used in the present invention. A vinyl alcohol polymer containing a terminal mercapto group can be prepared, for example, as described in Patent Reference No. 4. Specifically, it can be prepared, for example, by radically polymerizing a vinyl ester monomer such as a vinyl monomer mainly containing vinyl acetate in the presence of a thiol acid to provide a vinyl ester polymer, which is then saponified.

A saponification degree of a vinyl alcohol polymer containing a terminal mercapto group is preferably, but not limited to, 40 to 99.9 mol %. If a saponification degree is less than 40 mol %, a vinyl alcohol polymer block (A) is less crystalline and thus strength of an anion exchange membrane may be insufficient. A saponification degree described above is more preferably 60 mol % or more, further preferably 80 mol % or more. A saponification degree of a vinyl alcohol polymer containing a terminal mercapto group is generally 99.9 mol % or less. A saponification degree of a polyvinyl alcohol is measured in accordance with JIS K6726.

A polymerization degree of a vinyl alcohol polymer containing a terminal mercapto group is preferably 100 or more and 3500 or less, more preferably 200 or more and 3000 or less, further preferably 250 or more and 2500 or less. If a polymerization degree is less than 100, a final product, an anion exchange membrane containing a block copolymer (P) as a main element, may have an insufficient membrane strength. If a polymerization degree is more than 3500, mercapto groups are inadequately introduced to the vinyl alcohol polymer, so that a block polymer (P) may not be efficiently obtained. A viscosity average polymerization degree of a polyvinyl alcohol is measured in accordance with JIS K6726.

A vinyl alcohol polymer containing a terminal mercapto group thus prepared and a cationic-group containing monomer are used to provide a block copolymer (P) by an appropriate process such as that described in Patent Reference 3. That is, for example, as described in Patent Reference 3, a block copolymer (P) can be produced by radically polymerizing a cationic-group containing monomer in the presence of a vinyl alcohol polymer containing a terminal mercapto group. This radical polymerization can be conducted by any known method such as bulk polymerization, solution polymerization, pearl polymerization and emulsion polymerization, and preferably conducted in a solvent which can dissolve the vinyl alcohol polymer containing a terminal mercapto group, such as a water or dimethyl sulfoxide based medium. The polymerization process can be any of batch, semi-batch and continuous types.

The above radical polymerization can be conducted using a radical polymerization initiator suitable for polymerization selected from common initiators such as 2,2'-azobisisobutyronitrile, benzoyl peroxide, lauroyl peroxide, diisopropyl peroxycarbonate, potassium peroxodisulfate and ammonium persulfate. In aqueous polymerization, polymerization can be initiated by a redox reaction of a terminal mercapto group in the vinyl alcohol polymer with an oxidizing agent such as potassium bromate, potassium persulfate, ammonium persulfate and hydrogen peroxide.

A polymerization system is desirably acidic for radical polymerization of a monomer containing an ion exchange group in the presence of a vinyl alcohol polymer containing a terminal mercapto group. It is because under a basic condition, the mercapto group disappears due to its ionic addition to a double bond in the monomer so rapidly that a polymerization efficiency is considerably reduced. In an aqueous polymerization, it is preferable to conduct all of the polymerization steps at a pH of 4 or less.

Examples of a cationic-group containing monomer used in synthesis of a block copolymer (P) as described above include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinylbenzylammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzylammonium acetate, N,N,N-triethyl-N2-(4-vinylphenyl)ethylammonium chloride, N,N,N-triethyl-N2-(3-vinylphenyl)ethylammonium chloride, N,N-diethyl-N-methyl-N2-(4-vinylphenyl)ethylammonium chloride, N,N-diethyl-N-methyl-N2-(4-vinylphenyl)ethylammonium acetate; and quarternized salt of N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide or N,N-diethylaminopropyl(meth)acrylamide with methyl chloride, ethyl chloride, methyl bromide, ethyl bromide, methyl iodide or ethyl iodide or those whose anionic moiety is replaced with sulfonate, alkylsulfonate, acetate or alkylcarboxylate.

Specific examples include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl- 3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethylammonium bromide, trimethyl-3-(acryloylamino)propylammonium bromide, trimethyl-2-(methacryloyloxy)ethylammonium sulfonate, and trimethyl-3-(acryloylamino)propylammonium acetate. In addition, examples of a copolymerizable monomer include N-vinylimidazole and N-vinyl-2-methylimidazole.

When the block copolymer (P) described above is synthesized, a cationic-group containing polymer block (B) desirably consists of a monomer unit containing a cationic group to endow an anion exchange membrane of the present invention with higher ion-exchangeability, but it can contain a monomer unit without a cationic group. Examples of a monomer giving such a monomer unit without a cationic group include α-olefins such as ethylene, propylene, 1-butene, isobutene and 1-hexene; acrylic acid or its salts, or acrylates such as methyl acrylate, ethyl acrylate, n-propyl acrylate and isopropyl acrylate; methacrylic acid or its salts, or methacrylates such as methyl methacrylate, ethyl methacrylate, n-propyl methacrylate and isopropyl methacrylate; other unsaturated carboxylic acids or their derivatives such as fumaric acid, maleic acid, itaconic acid, maleic anhydride and itaconic anhydride; acrylamide derivatives such as acrylamide, N-methylacrylamide and N-ethylacrylamide; methacrylamide derivatives such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl group containing vinyl ethers such as ethyleneglycol vinyl ether, 1,3-propanediol vinyl ether and 1,4-butanediol vinyl ether; allyl ethers such as allyl acetate, propyl allyl ether, butyl allyl ether and hexyl allyl ether; oxyalkylene group containing monomers; hydroxyl group containing α-olefins such as isopropenyl acetate, 3-buten-1-ol, 4-penten-1-ol, 5-hexen-1-ol, 7-octen-1-ol, 9-decen-1-ol and 3-methyl-3-butene-1-ol; sulfonic group containing monomers such as ethylenesulfonic acid, allylsulfonic acid, methallylsulfonic acid and 2-acrylamide-2-methylpropanesulfonic acid; and silyl group containing monomers such as vinyltrimethoxysilane, vinyltriethoxysilane and vinyltriacetoxysilane. A monomer unit containing an ion exchange group is preferably contained in the polymer block (B) in a proportion of 80 mol % or more, particularly 90 mol % or more.

There are no particular restrictions to a reaction temperature of the above radical polymerization, which is properly 0 to 200° C. Timing of quenching the polymerization reaction can be determined by tracing polymerization progress by means of quantitative measurement of a residual monomer using, for example, any of various chromatographic methods and NMR spectrometry to attain a desired ratio of a vinyl alcohol polymer block (A) to a polymer block (B). The polymerization reaction is quenched by any known procedure such as cooling of a polymerization system.

For exhibiting adequate ion exchangeability as an anion exchange membrane for electrodialysis, a block copolymer (P) thus obtained has an ion-exchange capacity of preferably 0.30 meq/g or more, more preferably 0.50 meq/g or more. The upper limit of an ion-exchange capacity of the block copolymer is preferably 3.0 meq/g because an excessively large ion-exchange capacity makes the copolymer so hydrophilic that swelling cannot be controlled.

Furthermore, a block copolymer (P) can be preferably produced by first producing a block polymer having the above vinyl alcohol polymer block (A) and a block into which a cationic group can be introduced, and then introducing a cationic group to the block. The block copolymer into which a cationic group can be introduced can be produced as described for producing a block copolymer (P) using the above vinyl alcohol polymer containing a mercapto group and a cationic-group containing monomer, substituting a monomer having a moiety into which a cationic group can be introduced for a cationic-group containing monomer. Examples of a monomer having a moiety into which a cationic group can be introduced include vinylpyridines such as 2-vinylpyridine, 4-vinylpyridine and 2-methyl-5-vinylpyridine; vinylpyrimidines; vinylquinolines; vinylcarbazoles; vinylimidazoles; o,m,p-vinylphenylalkylenealkylamines; dialkylaminoalkyl acrylates; and dialkylaminoalkyl acrylates.

For introducing a cationic group into a block copolymer having a moiety into which a cationic group can be introduced, the block copolymer can be treated with vapor or a solution of an alkyl halide to quaternize its nitrogen atom. Here, an alkyl halide used can be any compound represented by $C_pH_{2p+1}X$ or $X(CH_2)_qX$ wherein p is an integer of 1 to 12, q is an integer of 2 to 12 and X is bromine or iodine. For introducing an anion exchange group into a block moiety having a halomethyl group, it can be treated with trialkyl amine.

An anion exchange membrane of the present invention can preferably contains, as a main element, a mixture of a block copolymer (P) prepared as described above and a vinyl alcohol polymer (Q) with a polymerization degree of 200 to 8000 (more preferably 500 to 7000) and a saponification degree of 80 mol % or more (more preferably 85 mol % or more), in which a mass ratio (P/Q) is 3/97 and which is subjected to a crosslinking treatment. By using a block copolymer (P) with a vinyl alcohol polymer (Q) as described above, an anion exchange membrane exhibiting adequate ion-exchange capacity and excellent resistance to organic fouling and higher strength can be provided.

A vinyl alcohol polymer (Q) may be a copolymer of a vinyl ester monomer with a monomer as described below, in which a moiety derived from the vinyl ester monomer has a polymerization degree of 200 to 8000 (more preferably 500 to 7000) and a saponification degree of 80 mol % or more (more preferably 85 mol % or more). Examples of the latter monomer include α-olefins such as ethylene, propylene, 1-butene, isobutene and 1-hexene; carboxylic acids, such as fumaric acid, maleic acid, itaconic acid, maleic anhydride and itaconic anhydride or their derivatives; acrylic acid or its salts, or acrylates such as methyl acrylate, ethyl acrylate, n-propyl acrylate and isopropyl acrylate; methacrylic acid or its salts or methacrylates such as methyl methacrylate, ethyl methacrylate, n-propyl methacrylate and isopropyl methacrylate; acrylamide derivatives such as acrylamide, N-methylacrylamide and N-ethylacrylamide; methacrylamide derivatives such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl group containing vinyl ethers such as ethyleneglycol vinyl ether, 1,3-propanediol vinyl ether and 1,4-butanediol vinyl ether; allyl ethers such as allyl acetate, propyl allyl ether, butyl allyl ether and hexyl allyl ether; oxyalkylene group containing monomers; hydroxyl group containing α-olefins such as isopropenyl acetate, 3-buten-1-ol, 4-penten-1-ol, 5-hexen-1-ol, 7-octen-1-ol, 9-decen-1-ol and 3-methyl-3-butene-1-ol; sulfonic group containing monomers such as ethylenesulfonic acid, allylsulfonic acid, methallylsulfonic acid and 2-acrylamide-2-methylpropanesulfonic acid; cationic-group containing monomers such as vinyloxyethyltrimethylammonium chloride, vinyloxybutyltrimethylammonium chloride, vinyloxyethyldimethylamine, vinyloxymethyldiethylamine, N-acrylamidemethyltrimethylammonium chloride, N-acrylamideethyltrimethylammonium chloride, N-acrylamidedimethylamine, allyltrimethylammonium chloride, methallyltrimethylammonium chloride, dimethylallylamine and allylethylamine; and silyl group containing monomers such as vinyltrimethoxysilane, vinyltriethoxysilane and vinyltriacetoxysilane. The above copolymer contains a vinyl-ester monomer unit preferably in 80 mol % or more, more preferably 90 mol % or more.

A vinyl alcohol polymer (Q) can be a terminally modified vinyl alcohol polymer prepared by radically polymerizing a vinyl ester monomer in the presence of a thiol compound such as 2-mercaptoethanol, n-dodecyl mercaptan, mercaptoacetic acid and 3-mercaptopropionic acid to give a vinyl ester polymer and then saponifing the vinyl ester polymer, which has a polymerization degree of 200 to 8000 (more preferably, 500 to 7000) and a saponification degree of 80 mol % or more (more preferably, 85 mol % or more).

A ratio (P/Q) of the block copolymer (P) to the vinyl alcohol polymer (Q) as mass ratio in the above mixture is preferably 5/95 or more, more preferably 10/90 or more. If the ratio (P/Q) is less than 3/97, a resulting anion exchange membrane may be insufficiently ion-exchangeable, leading to inadequate electrodialysis performance.

An anion exchange membrane of the present invention containing, as a main element, a block copolymer (P) can be produced by heating a film obtained from a solution of the block copolymer (P) at a temperature of 100° C. or more, then treating it with a dialdehyde compound in a solvent such as water, an alcohol and a mixture of these under an acidic condition for forming a cross-linking structure and then washing it with water. An anion exchange membrane of the present invention containing, as a main element, a mixture of a block copolymer (P) and a vinyl alcohol polymer (Q) can be produced by heating a film obtained from a solution of the block copolymer (P) and the vinyl alcohol polymer (Q) at a temperature of 100° C. or more, then treating it with a dialdehyde compound in a solvent such as water, an alcohol and a mixture of these under an acidic condition for forming a cross-linking structure and then washing it with water.

Examples of a solvent used in a solution of the block copolymer (P) or a solution of a mixture of the block copolymer (P) and the vinyl alcohol polymer (Q) generally include water; lower alcohols such as methanol, ethanol, 1-propanol and 2-propanol; and any mixture of these. A film can be formed by evaporating a solvent in a solution after casting. A temperature of the film formation is suitably, but not limited to, within the range of about room temperature to 100° C.

An anion exchange membrane of the present invention preferably has a thickness of about 1 to 1000 μm in the light of ensuring, for example, performance, membrane strength and handling properties required as an ion exchange membrane for electrodialysis. If a thickness is less than 1 μm, the membrane tends to have insufficient mechanical strength. On the other hand, if a thickness is more than 1000 μm, a membrane resistance is so increased that the membrane cannot exhibit adequate ion exchangeability and thus an electrodialysis efficiency tends to be reduced. A membrane thickness is more preferably 5 to 500 μm, further preferably 7 to 300 μm.

It is desirable that a process for producing an anion exchange membrane of the present invention is conducted with heating. Heating promotes physical crosslinking and increases mechanical strength of an anion exchange membrane obtained. Heating is generally, but not limited to, conducted using a hot-air dryer. A heating temperature is preferably, but not limited to, 50 to 250° C. If a heating temperature is lower than 50° C., an ion exchange membrane obtained may have insufficient mechanical strength. The temperature is more preferably 80° C. or higher, further preferably 100° C. or higher. On the other hand, if a heating temperature is higher than 250° C., a crystalline polymer may melt. The temperature is more preferably 230° C. or lower, further preferably 200° C. or lower.

It is preferable that a method for producing an anion exchange membrane of the present invention includes a crosslinking treatment. By subjecting a crosslinking treatment, mechanical strength of a resulting ion exchange layer can be increased. There are no particular restrictions to a crosslinking method as long as it can chemically bond molecular chains in a polymer. The method is generally immersing a membrane in a solution containing a crosslinking agent. Examples of such a crosslinking agent include formaldehyde and dialdehyde compounds such as glyoxal and glutaraldehyde. In the present invention, preferably, crosslinking is conducted by immersing the above film after heating in a solution of a dialdehyde compound in a solvent such as water, an alcohol and a mixture under an acidic condition. A concentration of a crosslinking agent is generally 0.001 to 1 vol % as a volume concentration of a crosslinking agent to a solution.

In a method for producing an anion exchange membrane of the present invention, heating and crosslinking can be conducted alone or in combination. When both heating and crosslinking are conducted, crosslinking can be conducted after heating, heating can be conducted after crosslinking, or alternatively these can be simultaneously conducted. Conducting crosslinking after heating is preferable in the light of mechanical strength of an anion exchange membrane obtained.

EXAMPLES

There will be further detailed the present invention with reference to Examples, but the present invention is not limited to these examples. In the examples, unless otherwise indicated, "%" and "part(s)" are by weight.

Reference Example

Synthesis of a Polyvinyl Alcohol Containing a Terminal Mercapto Group

A polyvinyl alcohol containing a terminal mercapto group shown in Table 1 was synthesized as described in Patent Reference No. 4.

TABLE 1

|  | Polymerization degree | Saponification degree (mol %) | Terminal group |
| --- | --- | --- | --- |
| PVA-1 | 1550 | 98.5 | Mercapto group |

Properties of ion exchange membranes in Examples and Comparative Examples were measured as described below.

1) Membrane Water Content (H)

A dry weight of an ion exchange membrane was preliminarily measured, then the membrane was immersed in deionized water until swelling equilibrium was achieved, and then a wet weight was measured. A membrane water content H was calculated according to the following equation:

$$H=[(W_w-D_w)/1.0]/[(W_w-D_w)/1.0+(D_w/1.3)]$$

wherein 1.0 and 1.3 are specific gravities of water and the polymer, respectively;

H is a water content of the membrane [–];

$D_w$ is a dry weight of the membrane [g]; and $W_w$ is a wet weight of the membrane [g].

2) Ultimate Tensile Stress

Using a JIS standard punch, an anion exchange membrane was cut into dumbbell-shaped pieces with a width of 2 mm and a length of 3 cm as measurement samples. Measurement was conducted using the Compact Table-Top Tester "EZ-Test500N" from Shimadzu Corporation with a distance between clips of 2 cm at 25° C. From a stress measured at a breaking point, an ultimate tensile stress at break was calculated according to the following equation.

Ultimate tensile stress at break [MPa]=Stress at a breakpoint [MPa] X Initial sectional area [m²]/Sectional area at break [m²]

3) Measurement of an Anion-Exchange Capacity

An anion exchange membrane was immersed in a 1 mol/l aqueous solution of HCl for 10 hours or longer. Then, a 1 mol/l aqueous solution of $NaNO_3$ was added to convert a chloride type to a nitride type and liberated chloride ions (A mol) were determined using a potentiometric titrator (COM-TITE-900; Hiranuma Sangyo Co., Ltd.).

Next, an identical anion exchange membrane was immersed in a 1 mol/l aqueous solution of HCl for 4 hours or longer, thoroughly washed with ion-exchanged water and then removed. The membrane was dried in a hot-air dryer at 105° C. for 16 hours and a dry weight (W[g]) was measured. An ion-exchange capacity was calculated according to the following equation.

$$\text{Ion-exchange capacity}=A\times 1000/W\,[\text{meq/g}]$$

4) Measurement of a Dynamic Transport Number

A dynamic transport number of an anion exchange membrane was determined as follows. An ion exchange membrane was inserted in a two-chamber cell having platinum black electrode plates as shown in FIG. 1, both sides of the ion exchange membrane were filled with a 0.5 mol/L solution of NaCl, and then electrodialysis was conducted with a predetermined current density (J=10 mAcm$^{-2}$) for a predetermined time (t). An effective membrane area was 8.0 cm² (2 cm×4 cm). Then, a measured solution was collected and diluted in a 300 mL volumetric flask. A conductivity of the diluted solution was measured by a conductance meter, and a measured conductivity was substituted in the following equation to calculate a dynamic transport number $t_{d+}$.

$$t_{d+}=\Delta m/E_a$$

wherein $t_{d+}$ is a dynamic transport number;

$E_a$ is a theoretical equivalent=I·t/F;

Δm is a transfer equivalent; and

F is a Faraday constant.

5) Measurement of a Membrane Resistance

Figure 2:
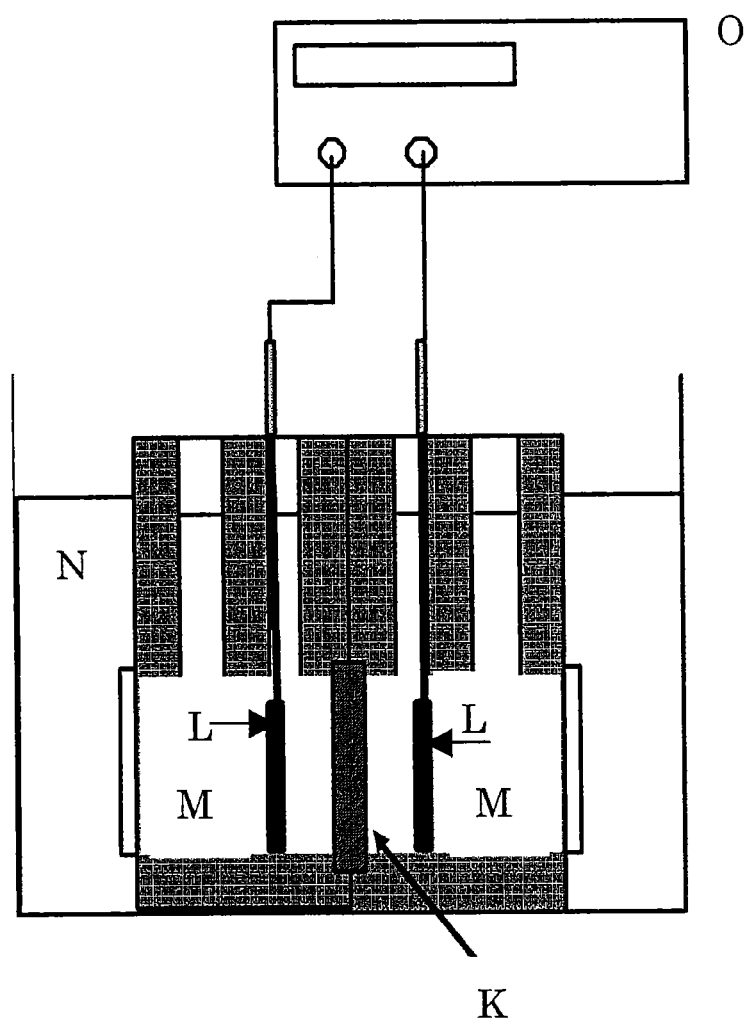
FIG. 2 schematically shows a device which can be used for determining a membrane resistance of an anion exchange membrane according to the present invention.

A membrane resistance was determined as follows. An anion exchange membrane was inserted in a two-chamber cell having platinum black electrode plates as shown in FIG. 2, both sides of the membrane were filled with a 0.5 mol/L solution of NaCl, then a resistance between electrodes was measured at 25° C. using a AC bridge (frequency: 1000 cycle/sec). A membrane resistance was determined from a difference between the above interelectrode resistance and an interelectrode resistance measured in the absence of an anion exchange membrane. The membranes used in the above measurement had been preliminarily equilibrated in a 0.5 mol/L solution of NaCl.

6) Determination of Resistance to Organic Fouling

A resulting anion exchange membrane was conditioned and inserted in a two-chamber cell having a silver and a silver chloride electrodes. The anode chamber was filled with a 0.05 mol/L solution of NaCl while the cathode chamber was filled with a mixture of 1000 ppm sodium dodecylbenzenesulfonate and 0.05 mol/L NaCl. While the solutions of both chambers were stirred at a rotation rate of 1500 rpm, electrodialysis was conducted at a current density of 0.2 A/dm². At this time, platinum wires were fixed in the vicinity of both sides of the membrane and an inter-membrane voltage was measured. When organic fouling occurs during current application, an inter-membrane voltage increases. An inter-membrane voltage 30 min after initiating current application was measured and a difference (ΔE) between voltages in the presence of and in the absence of an organic fouling was determined and used as a measure of membrane contamination.

(Synthesis of P-1)

In a 5-liter four-necked separable flask equipped with a reflux condenser and a stirring blade were charged 2600 g of water and 344 g of PVA-1 shown in Table 1 as a vinyl alcohol polymer containing a terminal mercapto group, and the mixture was heated with stirring to 95° C. for dissolving the vinyl alcohol polymer and then cooled to room temperature. To the aqueous solution was added 1/2 N sulfuric acid to adjust pH to 3.0. Separately, 183 g of methacrylamidepropyl trimethylammonium chloride was dissolved in 200 g of water, and the resulting solution was added to the previous aqueous solution with stirring, and then the mixture was heated to 70° C. while the system atmosphere was replaced by nitrogen by bubbling nitrogen gas into the aqueous solution for 30 min. After the replacement by nitrogen, to the aqueous solution was added portionwise 121 mL of a 2.5% aqueous solution of potassium persulfate over 1.5 hours to initiate block co-polymerization which was then allowed to proceed. The polymerization was allowed to further proceed by maintaining a system temperature at 75° C. for one hour, and the reaction was then cooled to give an aqueous solution of PVA-(b)-p-methacrylamidepropyl trimethylammonium chloride block copolymer with a solid content of 15%. A part of the resulting solution was dried, then dissolved in deuterium oxide and analyzed by $^1$H-NMR at 400 MHz, which indicated that the vinyl alcohol polymer was modified with the methacrylamidepropyl trimethylammonium chloride unit in 10 mol %. A viscosity of a 4% aqueous solution was 18 mPa·s (20° C.) as measured by a B type viscometer.

(Synthesis of P-2 to P-5)

P-2 to P-5 were synthesized as described for P-1, except that the polymerization conditions such as the type and the amount of a cationic-group containing monomer and the amount of a polymerization initiator were changed as shown in Table 2. Physical properties of a polymer obtained are shown in Table 2.

(Synthesis of P-6)

An aqueous solution of a PVA-(b)-vinylformamide block copolymer with a solid concentration of 15% was prepared as described for P-1, except that the polymerization conditions such as the type and the amount of a cationic-group containing monomer and the amount of a polymerization initiator were changed as shown in Table 2 (A part of the resulting aqueous solution was dried, then dissolved in deuterium oxide and analyzed by $^1$H-NMR at 400 MHz. As a result, the polymer was modified with the vinylformamide unit in 10 mol %).

(Synthesis of P-7: hydrolysis of P-6)

To a 15% aqueous solution of P-6 was added sodium hydroxide to 0.08 mol %, and the mixture was hydrolyzed by heating at 110° C. for one hour to prepare an aqueous solution of a PVA-(b)-vinylamine block copolymer with a solid concentration of 14% (A part of the resulting aqueous solution was dried, then dissolved in deuterium oxide and analyzed by $^1$H-NMR at 400 MHz. As a result, the polymer was modified with the vinylamine unit in 10 mol %). A viscosity of a 4% aqueous solution was 16 mPa·s (20° C.) as measured by a B type viscometer.

(Synthesis of P-8)

An aqueous solution of a PVA-(b)-vinylpyridine block copolymer with a solid concentration of 15% was prepared as described for P-1, except that the polymerization conditions such as the type and the amount of a cationic-group containing monomer and the amount of a polymerization initiator were changed as shown in Table 2 (A part of the resulting aqueous solution was dried, then dissolved in deuterium oxide and analyzed by $^1$H-NMR at 400 MHz. As a result, the polymer was modified with the vinylpyridine unit in 10 mol %).

(Synthesis of P-9: Quaternization of P-8)

An aqueous solution of P-8 was applied on an acrylic cast plate with 270 mm long×210 mm wide and, after removing an excessive solution and bubbles, dried on a hot plate at 50° C. for 24 hours to form a film. The film thus formed was treated in methyl iodide vapor at room temperature for 10 hours for quaternizing a vinylpyridine moiety to provide a PVA-(b)-quaternized vinylpyridine block copolymer film (A part of the resulting film was dissolved in deuterium oxide and analyzed by $^1$H-NMR at 400 MHz. As a result, the polymer was modified with the quaternized vinylpyridine unit in 10 mol %). A viscosity of an aqueous solution whose concentration was adjusted to 4% was 16 mPa·s (20° C.) as measured by a B type viscometer.

(Synthesis of P-10)

To a 6 L separable flask equipped with a stirrer, a temperature sensor, a dropping funnel and a reflux condenser were charged 2156 g of vinyl acetate, 644 g of methanol and 126 g of a 25% by weight solution of methacrylamide propyltrimethylammonium chloride in methanol, and after the atmosphere of the system was substituted by nitrogen under stirring, the system was heated to an internal temperature of 60° C. To this system was added 20 g of methanol containing 0.8 g of 2,2'-azobisisobutyronitrile, to initiate a polymerization reaction. The polymerization reaction was continued for 4 hours while 400 g of a 25% by weight solution of methacrylamide propyltrimethylammonium chloride in methanol was added to the reaction system from the initiation of the polymerization, and then the polymerization reaction was quenched. At the quenching of the polymerization reaction, a solid concentration in the system, that is, a solid content to the whole polymerization reaction slurry, was 24% by weight. Next, unreacted vinyl acetate monomer was expelled by introducing methanol vapor into the system to provide a 55% by weight solution of a vinyl ester copolymer in methanol.

To the 55% by weight solution of a vinyl ester copolymer in methanol were, under stirring, sequentially added methanol and a 10% by weight solution of sodium hydroxide in methanol such that a molar ratio of sodium hydroxide to a vinyl acetate unit in the copolymer was 0.025 and the vinyl ester copolymer was contained in a solid concentration of 30% by weight, and a saponification reaction was initiated at 40° C.

Immediately after a gelated material was formed as the saponification reaction proceeded, the material was removed from the reaction system and pulverized, and then one hour after the formation of the gelated material, the pulverized material was neutralized by adding methyl acetate to provide a swollen cationic polymer of poly(vinyl alcohol-methacrylamide propyltrimethylammonium chloride). Six times the mass of methanol was added to the swollen cationic polymer (liquor ratio: 6), and the polymer was washed under reflux for one hour, and then the polymer was collected by filtration. The polymer was dried at 65° C. for 16 hours. The resulting polymer was dissolved in deuterium oxide and analyzed by $^1$H-NMR at 400 MHz. As a result, the polymer was modified with the methacrylamide propyltrimethylammonium chloride unit in 5 mol %. A viscosity of a 4% aqueous solution was 18 mPa·s (20° C.) as measured by a B type viscometer and a saponification degree was 98.5 mol %.

Example 1

Production of an Ion Exchange Membrane

An aqueous solution of P-1 was applied on an acrylic cast plate with 270 mm long×210 mm wide and, after removing an excessive solution and bubbles, dried on a hot plate at 50° C. for 24 hours to form a film. The film thus formed was heated at 140° C. for 30 min to be physically crosslinked. Then, the film was immersed in a 2 mol/L aqueous solution of an electrolyte, sodium sulfate for 24 hours. To the aqueous solution was added concentrated sulfuric acid to adjust the pH of the aqueous solution to 1, and then the film was immersed in a 0.05% by volume aqueous solution of glutaraldehyde, which was then stirred by a stirrer at 25° C. for 24 hours to conduct crosslinking. Here, the aqueous solution of glutaraldehyde was prepared by diluting glutaraldehyde (25% by volume) from Ishizu Chemicals Co. with water. After the crosslinking, the film was immersed in deionized water until the film reached swelling equilibrium, during which deionized water was replaced several times, to provide an anion exchange membrane.

(Evaluation of an Ion Exchange Membrane)

The anion exchange membrane thus produced was cut into pieces with a desired size, which were used as measurement samples. The measurement samples were determined for water content of a membrane, ultimate tensile stress, an anion-exchange capacity, a dynamic transport number, a membrane resistance and resistance to organic fouling as described above. The results obtained are shown in Table 3.

Examples 2 to 13

An anion exchange membrane was produced and evaluated as described in Example 1, except that an anion exchange resin in which a mixing ratio of a block copolymer (P) and a polyvinyl alcohol, PVA 124 (Kuraray Co., Ltd.) was changed as shown in Table 3 and a heating temperature and crosslinking conditions were changed as shown in Table 3. The results obtained are shown in Table 3.

Comparative Examples 1 and 3

Membrane properties of an anion exchange membrane were determined as described in Example 1, except that an anion exchange resin, a heating temperature and crosslinking conditions were changed as shown in Table 3. The measurement results obtained are shown in Table 3.

Comparative Example 2

Membrane properties of an ion exchange membrane were determined as described in Example 1, except that NEO-SEPTA AM-1 (a styrene-divinylbenzene membrane; TOKUYAMA Corporation) was used as an anion exchange membrane. The measurement results obtained are shown in Table 3.

The results in Table 3 indicate that an anion exchange membrane consisting of a block copolymer having a vinyl alcohol polymer block and a cationic-group containing polymer block as components and having a crosslinked structure is resistant to swelling and improved in a dynamic transport number, a membrane resistance and resistance to organic fouling (Examples 1 to 13). In particular, it is indicated that when a mass ratio of a block copolymer (P) to a vinyl alcohol polymer (Q) (P/Q) is 3/97 or more, an ultimate tensile stress at break is satisfactory (Examples 1 to 13). It is also indicated that a heating temperature of 100° C. or higher is preferable because a swelling degree is low (Examples 1 to 5 and Examples 7 to 13). Furthermore, it is indicated that an ion-exchange capacity of 0.30 meq/g or more results in a dynamic transport number comparable to that in a commercially available ion exchange membrane and a lower membrane resistance (Examples 1 to 7 and 9 to 10). In contrast, without crosslinking, an ion exchange membrane was significantly swollen, so that membrane properties could not be measured (Comparative Example 1). Furthermore, a commercially available ion exchange membrane which was highly hydrophobic exhibited inadequate resistance to organic fouling (Comparative Example 2). Furthermore, a vinyl alcohol polymer having a cationic group introduced by random copolymerization exhibited a higher membrane resistance (Comparative Example 3).

TABLE 2

| | | Polymerization conditions | | | | | | | |
|---|---|---|---|---|---|---|---|---|---|
| | PVA polymer | | Cationic-group containing monomer*1 | | Aqueous solution of an initiator | | Polymerization time (hr) | Solid conc. (wt %) | Block polymer (P) | |
| | Type | Amount (g) | Type | Amount (g) | Water (g) | Concentration (wt %) | Amount (mL) | | | Viscosity (mPa · s) | Modified amount (mol %) |
| P-1 | PVA-1 | 344 | MAPTAC | 183 | 2800 | 2.5 | 121 | 1.5 | 15 | 18 | 10 |
| P-2 | PVA-1 | 344 | DADMAC | 134 | 2500 | 2.5 | 121 | 1.5 | 15 | 18 | 10 |
| P-3 | PVA-1 | 344 | VBTMAC | 285 | 3350 | 2.5 | 121 | 1.5 | 18 | 18 | 15 |
| P-4 | PVA-1 | 344 | VBTMAC | 89.6 | 2250 | 2.5 | 121 | 1.5 | 15 | 16 | 5 |
| P-5 | PVA-1 | 344 | VBTMAC | 17.9 | 1850 | 2.5 | 121 | 1.5 | 15 | 16 | 1 |
| P-6 | PVA-1 | 344 | NVF | 48 | 2000 | 2.5 | 121 | 1.5 | 15 | 16 | 10 |
| P-8 | PVA-1 | 344 | Vpy | 89 | 2250 | 2.5 | 121 | 1.5 | 15 | 16 | 10 |

*1MAPTAC: methacrylamide propyltrimethylammonium chloride, DADMAC: diallyldimethylammonium chloride, VBTMAC: vinylbenzyltrimethylammonium chloride, NVF: N-vinylformamide, VPy: 2-vinylpyridine

TABLE 3

| | Anion-exchange resin | | | Heating temperature Temp (° C.) | Crosslinking conditions | | Ultimate tensile stress at break (MPa) | Membrane water content (—) | Ion-exchange capacity (meq/g) | Dynamic transport number (—) | Membrane resistance (Ω · cm²) | Resistance to organic fouling (mV) |
|---|---|---|---|---|---|---|---|---|---|---|---|---|
| | Block polymer (P) | PVA(Q) | (P)/(Q) | | Type of crosslinking agent | Concentration (Vol %) | | | | | | |
| Example 1 | P-1 | None | 10/0 | 140 | GA | 0.05 | 10 | 0.33 | 1.7 | 0.98 | 0.84 | 30 |
| Example 2 | P-1 | PVA124 | 9/1 | 140 | GA | 0.05 | 17 | 0.33 | 1.5 | 0.98 | 0.84 | 30 |
| Example 3 | P-2 | PVA124 | 9/1 | 140 | GA | 0.05 | 17 | 0.33 | 1.6 | 0.98 | 0.84 | 30 |
| Example 4 | P-3 | PVA124 | 9/1 | 140 | GA | 0.05 | 17 | 0.35 | 2 | 0.98 | 0.87 | 15 |
| Example 5 | P-3 | PVA124 | 9/1 | 110 | GA | 0.05 | 15 | 0.48 | 1.5 | 0.98 | 0.86 | 30 |
| Example 6 | P-3 | PVA124 | 9/1 | 90 | GA | 0.05 | 13 | 0.63 | 1.5 | 0.98 | 0.84 | 30 |
| Example 7 | P-4 | PVA124 | 9/1 | 140 | GA | 0.05 | 17 | 0.31 | 0.9 | 0.94 | 1.03 | 40 |
| Example 8 | P-5 | PVA124 | 9/1 | 140 | GA | 0.05 | 17 | 0.31 | 0.2 | 0.85 | 1.36 | 80 |
| Example 9 | P-7 | PVA124 | 9/1 | 140 | GA | 0.05 | 17 | 0.33 | 2 | 0.98 | 0.86 | 30 |
| Example 10 | P-9 | PVA124 | 9/1 | 140 | GA | 0.05 | 17 | 0.33 | 1.8 | 0.98 | 0.86 | 30 |
| Example 11 | P-1 | PVA124 | 3/97 | 140 | GA | 0.05 | 23 | 0.3 | 0.05 | 0.63 | 15.7 | 30 |
| Example 12 | P-1 | PVA124 | 5/95 | 140 | GA | 0.05 | 23 | 0.3 | 0.09 | 0.66 | 10.3 | 30 |
| Example 13 | P-1 | PVA124 | 10/90 | 140 | GA | 0.05 | 21 | 0.3 | 0.17 | 0.7 | 6.4 | 30 |
| Comparative Example 1 | P-1 | PVA124 | 10/0 | None | None | | 17 | *2 | *3 | | | |
| Comparative Example 2 | *1 | — | — | — | — | | 18 | 0.32 | 2 | 0.98 | 1.62 | 210 |
| Comparative Example 3 | P-10 | None | 10/0 | 140 | GA | 0.05 | 17 | 0.68 | 0.9 | 0.9 | 2.11 | 80 |

*1 Commercially available anion exchange membrane "NEOSEPTA AM-1": (a styrene-divinylbenzene membrane; TOKUYAMA Corporation)
*2 Membrane properties cannot be measured due to dissolution of an ion exchange membrane
*3 Membrane properties cannot be measured due to significant swelling of a membrane

REFERENCE SIGNS LIST

A: power source
B: ampere meter
C: coulomb meter
D: voltmeter
E: motor
F: stirrer
G: cathode electrode
H: anode electrode
I: 0.5 M aqueous solution of NaCl
J: ion exchange membrane (effective membrane area: 8.0 cm$^2$)
K: ion exchange membrane (effective area: 1.0 cm$^2$)
L: platinum electrode
M: aqueous solution of NaCl
N: water bath, and O: LCR meter

The invention claimed is:

1. An anion exchange membrane, comprising, as main elements:
   a mixture of a block copolymer (P), and
   a nonionic vinyl alcohol homopolymer or nonionic vinyl alcohol copolymer (Q), wherein
   the block copolymer (P) comprises a vinyl alcohol polymer block (A) and a cationic-group comprising polymer block (B) as components, and
   wherein the polymer block (B) comprises a repeating unit of formula (3):

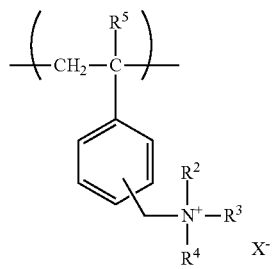

(3)

wherein
R$^2$, R$^3$, and R$^4$ independently of each other are hydrogen, a substituted or nonsubstituted alkyl group containing 1 to 18 carbon atoms, a substituted or nonsubstituted aryl group containing 6 to 18 carbon atoms, or a substituted or nonsubstituted aralkyl group containing 7 to 18 carbon atoms which are optionally combined to form a saturated or unsaturated cyclic structure,
R$^5$ is hydrogen or methyl group, and
X$^-$ is an anion,
wherein said nonionic vinyl alcohol homopolymer or nonionic vinyl alcohol copolymer (Q) has a polymerization degree of 200 to 8000 and a saponification degree of 80 mol % or more,
wherein a mass ratio (P/Q) of said block copolymer (P) to said nonionic vinyl alcohol homopolymer or nonionic vinyl alcohol copolymer (Q) is 3/97 or more, and
wherein the anion exchange membrane is crosslinked, and
wherein said membrane is formed by:
heating a film obtained from a solution comprising said block copolymer (P) and said nonionic vinyl alcohol homopolymer or nonionic vinyl alcohol copolymer (Q); and
crosslinking the film.

2. The membrane of claim 1, wherein an ion-exchange capacity is 0.30 meq/g or more.

3. A method for producing the membrane of claim 1, the method comprising:
heating a film obtained from a solution comprising said block copolymer (P) and said nonionic vinyl alcohol homopolymer or nonionic vinyl alcohol copolymer (Q) at a temperature of 100° C. or more;
crosslinking the film with a dialdehyde compound in at least one member selected from the group consisting of water and an alcohol, under an acidic condition; and then washing the film with water.

4. The membrane of claim 1, wherein a ratio of repeating units of the vinyl alcohol polymer block (A) to the cationic-group comprising polymer block (B) in the block copolymer (P) is within a range of 99:1 to 50:50.

5. The membrane of claim 1, wherein a ratio of repeating units of the vinyl alcohol polymer block (A) to the cationic-group comprising polymer block (B) in the block copolymer (P) is within a range of 98:2 to 60:40.

6. The membrane of claim 1, wherein a ratio of repeating units of the vinyl alcohol polymer block (A) to the cationic-group comprising polymer block (B) in the block copolymer (P) is within a range of 95:5 to 70:30.

\* \* \* \* \*